(12) United States Patent
Embach

(10) Patent No.: US 6,971,827 B1
(45) Date of Patent: Dec. 6, 2005

(54) APPARATUS FOR RETAINING OBJECTS ON MOUNTING SURFACES

(75) Inventor: James T. Embach, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/951,417

(22) Filed: Sep. 28, 2004

(51) Int. Cl.[7] ............................................. B61D 45/00
(52) U.S. Cl. ..................................... 410/97; 296/97.23
(58) Field of Search ............................. 410/96, 97, 98, 410/156; 296/97.23

(56) References Cited

U.S. PATENT DOCUMENTS

| | | | | |
|---|---|---|---|---|
| 3,669,817 A | * | 6/1972 | McDevitt | 428/82 |
| 3,986,656 A | * | 10/1976 | November | 229/120.35 |
| 4,481,240 A | * | 11/1984 | Roth | 428/95 |
| 4,575,146 A | * | 3/1986 | Markos | 296/39.2 |
| 4,748,063 A | * | 5/1988 | Reuben | 428/78 |
| 4,838,745 A | * | 6/1989 | Haydock | 410/121 |
| 4,900,204 A | * | 2/1990 | Summers | 410/97 |
| 4,968,548 A | * | 11/1990 | Gibson et al. | 428/95 |
| 4,972,529 A | * | 11/1990 | Wolfson, Jr. | 4/500 |
| 5,215,205 A | * | 6/1993 | Behlman | 220/4.31 |
| 5,392,972 A | * | 2/1995 | Caruso et al. | 224/42.34 |
| 5,518,170 A | * | 5/1996 | Rasmussen | 229/120.26 |
| 5,570,921 A | * | 11/1996 | Brooker | 296/39.1 |
| 5,601,271 A | * | 2/1997 | Janowski et al. | 248/503 |
| 5,662,305 A | * | 9/1997 | Shimamura et al. | 248/500 |
| 5,716,176 A | * | 2/1998 | Anderson | 410/118 |
| 5,804,273 A | * | 9/1998 | Drake et al. | 428/86 |
| 6,017,174 A | * | 1/2000 | Ross et al. | 410/100 |
| 6,070,729 A | * | 6/2000 | Barnes | 206/581 |
| 6,234,733 B1 | * | 5/2001 | Parr | 410/94 |
| 6,244,802 B1 | * | 6/2001 | Stanesic et al. | 410/94 |
| 6,296,733 B1 | * | 10/2001 | Hudkins et al. | 156/245 |
| 6,298,624 B1 | * | 10/2001 | Pacione | 52/511 |
| 6,306,477 B1 | * | 10/2001 | Pacione | 428/62 |
| 6,395,362 B1 | * | 5/2002 | Pacione | 428/45 |
| 6,460,303 B1 | * | 10/2002 | Pacione | 52/311.2 |
| 6,471,276 B1 | * | 10/2002 | Brunsman et al. | 296/37.13 |
| 6,751,816 B1 | * | 6/2004 | Wechsler | 5/417 |
| 6,766,566 B2 | | 7/2004 | Cheng et al. | 24/452 |
| 6,779,956 B2 | * | 8/2004 | Strumolo et al. | 410/121 |

FOREIGN PATENT DOCUMENTS

GB         2196907        * 5/1988

* cited by examiner

*Primary Examiner*—H. Gutman
(74) *Attorney, Agent, or Firm*—Laura C. Hargitt

(57) ABSTRACT

The apparatus includes at least one net member having opposed surfaces and the mounting surface includes one of a plurality of hook members and a plurality of loop members. One of the surfaces of the at least one net member includes the other of the plurality of hook members and the plurality of loop members. The at least one net member is operable to be alternately removed from and attached to the mounting surface and retain objects to the mounting surface. The net member is operable to be mounted to the mounting surface in a stowed position to provide a smooth appearance on the mounting surface when not retaining an object.

19 Claims, 5 Drawing Sheets

US 6,971,827 B1

APPARATUS FOR RETAINING OBJECTS ON MOUNTING SURFACES

BACKGROUND OF THE INVENTION

The present invention relates generally to storage devices for automotive vehicles and, in particular, to an apparatus for retaining objects on a mounting surface.

Storing items in a vehicle is a continuing concern, especially for those items without squared corners or the like which do not lend themselves to easy storage within the vehicle trunk, the passenger compartment, or other storage locations. After market "bungee" tie-down cords, cinch straps, and tie-down straps may be used for securing cargo but these may be misplaced and are difficult to store efficiently. Automobile manufacturers have provided cargo nets as part of standard or optional packages but these cargo nets may be susceptible to tangling, have a predetermined location for attachment and do not secure odd-shaped objects well.

It is desirable, therefore, to provide an apparatus for storing objects within the vehicle interior that is aesthetically pleasing yet robust enough to hold large and/or odd-shaped objects.

SUMMARY OF THE INVENTION

The present invention concerns an apparatus for retaining objects on a mounting surface. The apparatus includes at least one net member having opposed surfaces and the mounting surface includes one of a plurality of hook members and a plurality of loop members. One of the surfaces of the at least one net member includes the other of the plurality of hook members and the plurality of loop members. The at least one net member is operable to be alternately removed from and attached to the mounting surface and retain objects to the mounting surface. The net member is operable to be mounted to the mounting surface in a stowed position to provide a smooth appearance on the mounting surface when not retaining an object.

When not in use, the apparatus in accordance with the present invention is more aesthetically pleasing than a cargo net or tie-down cords or straps and stores easier than a cargo net or tie-down cords or straps. The apparatus is resistant to tangling even if formed as a plurality of members. Preferably, at least one of the surfaces of the net member includes a plurality of loop members adapted to cooperate with a plurality of hook members on the other of the surfaces of the net member.

The mounting surface is preferably located in a vehicle interior. The apparatus in accordance with the present invention is strong in shear when attached to the mounting surface and is resistant to forces from accelerating, braking and cornering during vehicle operation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
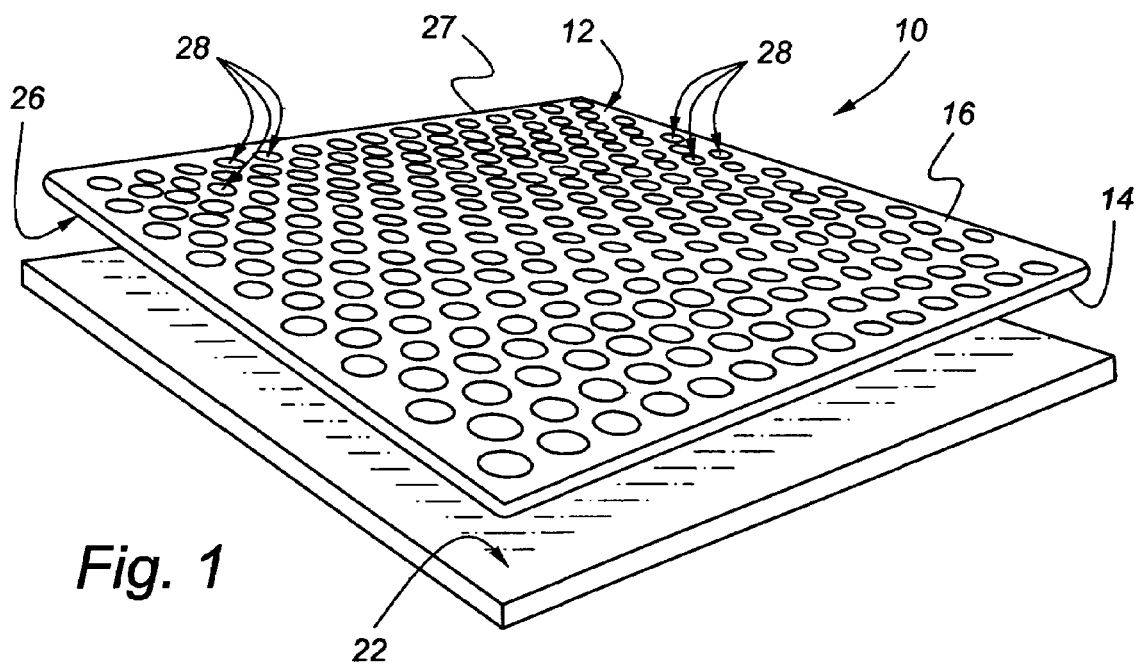
FIG. 1 is a perspective view of an apparatus in accordance with the present invention shown adjacent a mounting surface in an unattached position.
Figure 2:
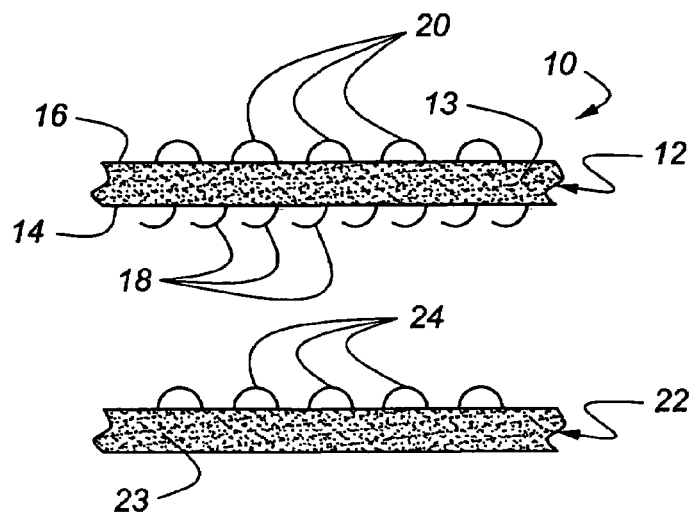
FIG. 2 is a fragmentary end view on an enlarged scale of the apparatus of FIG. 1.

Referring now to FIGS. 1–6, an apparatus for retaining objects on a mounting surface in accordance with the present invention is indicated generally at 10. The apparatus 10 includes a net member 12 having a first side 14 and a second side 16. Best seen in FIG. 2, the first side 14 of the net member 12 includes a plurality of hook members 18 attached to a base material 13 such as by adhesive or the like as is known to those skilled in the art of fabricating hook and loop fasteners. The hook members 18 are preferably evenly spaced apart along the first side 14. The net member 12 also includes a plurality of loop members 20 extending from the second side 16. The loop members are preferably attached to the base material 13 of the net member 12 in a conventional fashion known to those skilled in the art of fabricating hook and loop fasteners. The base material 13 of the net member 12 may be formed of a flexible fabric material such as, for example, a cotton blend, a polyester blend or the like. More preferably, the base material 13 of the net member 12 is formed of an elastic material, such as a neoprene material, a "Spandex" material, a thermoplastic rubber material, an isoprene material or the like or from a flexible material having elastic fibers interwoven therein for easier manipulation of the net member 12 during use, discussed in more detail below.

The net member 12 is adapted to be attached to a loadfloor or mounting surface 22. The mounting surface 22 is preferably substantially planar and includes a plurality of loop members 24 attached on an upper surface of a base material 23 thereof such as by adhesive or the like as is known to those skilled in the art of fabricating hook and loop fasteners for attaching to the hook members 18 of the first side 14 of the net member 12. The loop members 24 are preferably the same as or substantially similar to the loop members 20 on the second side 16 of the net member 12. The substantially planar mounting surface 22 may include some curvature as a part of the surface 22. Alternatively, the mounting surface 22 is at least partially curvilinear and the net member 12 is contoured for secure attachment thereto. Those skilled in the art will appreciate that the mounting surface 22 may be formed in any shape or contour and the net member 12 may be formed in any shape advantageous for securely attaching to the mounting surface 22 while remaining within the scope of the present invention. Although shown in a rectangular shape for ease of illustration, those skilled in the art will appreciate that the net member 12 in accordance with the present invention may be formed in any size or shape to securely attach to the mounting surface 22 of varying sizes and shapes.

The mounting surface 22 is preferably located in an interior of an automotive vehicle (not shown) and may be, but is not limited to, a trunk floor, a load floor in a station wagon or sport utility vehicle, an inner panel of a door, a rear surface of a vehicle seat, or the like. The hook members 18 and the loop members 20 and 24 are preferably commercially available hook and loop fasteners such as those available from Velcro USA Inc., Aplix Fasteners UK Ltd., 3M Corporation, Microplast Corporation or other suppliers well known to those skilled in the art. The surface area occupied by the hook members 18 and the loop members 20 and 24 is preferably substantially equal to surface area of the surfaces 14, 16, and 22. Alternatively, the surface area occupied by the hook members 18 and the loop members 20 and 24 occupy only a substantial portion of the surface area of the surfaces 14, 16, and 22, preferably around the perimeter of the net member 12.

The net member 12 preferably includes a hem 26 formed on an edge 27 thereof. Preferably, at least a portion of the edge 27 is fixedly secured to the mounting surface 22. The hem 26 allows the net member 12 to be manipulated more easily when detaching and reattaching the net member 12 and the mounting surface 22, discussed in more detail below. The net member 12 includes at least one and preferably a plurality of apertures 28 extending therethrough. The apertures 28 are preferably, but are not limited to, circular in shape and allow the net member 12 to flex and bend when storing an object 30, best seen in FIG. 5, on the mounting surface 22, discussed in more detail below. Alternatively, the apertures 28 are formed in any shape that allows that net member 12 to flex and bend when storing an object on the mounting surface 22 including, but not limited to, a rectangular shape, a triangular shape, or an oblong shape.

Figure 3:
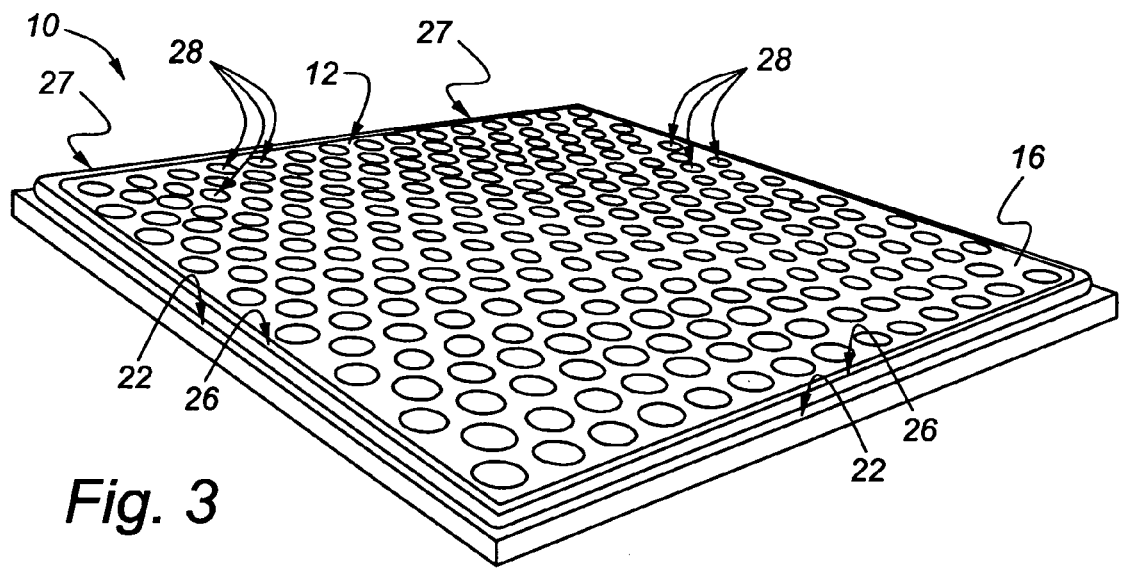
FIG. 3 is a perspective view of the apparatus of FIG. 1 shown attached to the mounting surface.
Figure 4:
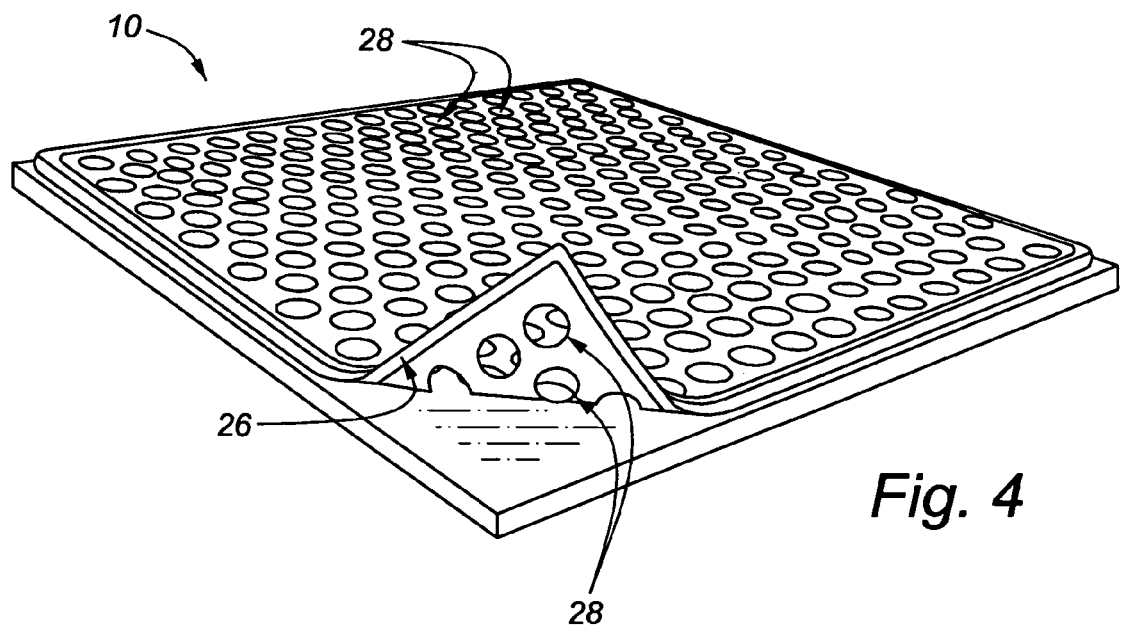
FIG. 4 is a perspective view of a portion of the apparatus of FIG. 1 shown partially removed from the mounting surface.
Figure 5:
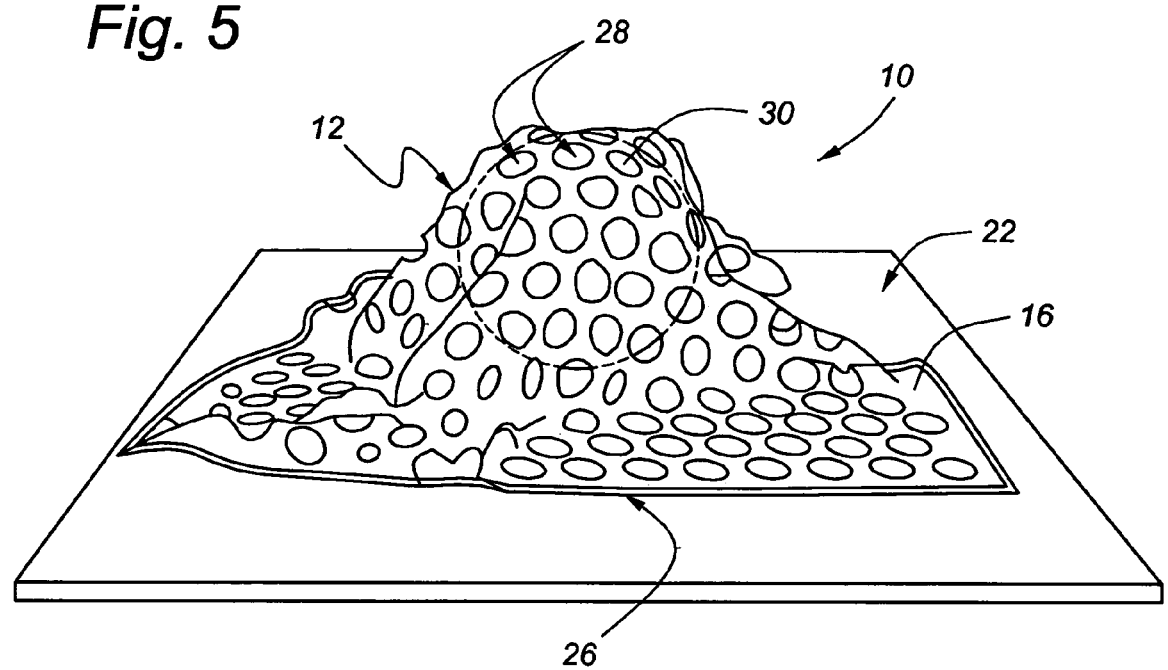
FIG. 5 is a perspective view of the apparatus of FIG. 1 shown with an object secured to the mounting surface.

Best seen in FIG. 3, the net member 12 is adapted to be attached to the mounting surface 22 in a stowed position that is substantially coplanar therewith. In the stowed position, substantially the entire net member 12 is mated with the mounting surface 22 whereby the hook members 18 attach to the loop members 24, securing the net member 12 to the mounting surface 22. When the net member 12 is attached to the mounting surface 22 in the stowed position, the loop members 20 of the second side 16 of the net member 12, in combination with the loop members 24 of the mounting surface 22 provide an appearance of textured carpet with a smooth, aesthetically pleasing appearance. The net member 12, therefore, when not in use in the stowed position, is only a subtle presence on the mounting surface 22. The net member 12, in the stowed position, occupies virtually no cargo space and is aesthetically pleasing with an appearance similar to a vehicle that does not include the net member 12.

The net member 12 is operable to retain an object 30 to the mounting surface 22 by the interaction between the hook members 18 and the loop members 24 in the well-known manner of hook and loop fasteners. The hook members 18 and the loop members 24 are advantageously self-anchoring in that only slight pressure or force on the surface 16 is required to attach the hook members 18 to the loop members 24. The interaction between the hook members 18 and the loop members 24 is very strong in shear, and is resistant to forces from accelerating, braking and cornering during vehicle operation but may be easily removed from the mounting surface 22.

In operation, the net member 12 is placed adjacent the mounting surface 22. Preferably, at least a portion of the edge 27 is fixedly attached to the mounting surface 22. By fixedly attaching the edge 27 to the mounting surface 22, the net member 12 may be more easily repositioned on the mounting surface 22, which is especially advantageous in difficult to access locations such as the forward portion of a trunk floor or the like. When attached, the apparatus 10 has a smooth appearance similar to textured carpet because the sight lines of the loop members 20 and 24 are broken only by the hook members 18 visible through the apertures 28.

The steps required for an operator to move the net member 12 from its stowed position and secure an object to the mounting surface 22 are easy and quick. When an object, such as the object 30, is secured to the mounting surface 22, the net member 12 is manually disconnected or peeled from the stowed position, best seen in FIG. 3, adjacent the mounting surface 22 by grasping the hem 26 and providing a force to disconnect the hook members 18 from the loop members 24. The net member 12 is removed enough so that the object 30 may be placed thereunder, after which the net member 12 is draped over the top of the object 30 and the hook members 18 reattached to the loop members 24 around the perimeter of the object 30. The elastic properties of the net member 12 allow for objects, such as the object 30, defining an area at least as large an area as the area of the net member 12 to be secured to the mounting surface 22, as the net member 12 will stretch to envelope the object 30. In such a situation, the fixedly secured edge 27 is especially advantageous, as it provides a fixed location from which the net member 12 can flex and stretch to secure the object 30.

The apparatus 10 is advantageously self-attaching, requiring only a portion of the hook members 18 to attach to the loop members 24 on the mounting surface 22 in order to firmly secure the object 30 to the mounting surface 22. The apparatus 10 advantageously does not require a separate structure adjacent the mounting surface 22 to attach a separate strap or cord thereto and does not require a separate storage space for a strap, a cord, or the like. The apertures 28 provide additional flexibility for the net member 12 when attaching the object 30 to the mounting surface 22. The apparatus 10 is especially advantageous for securing objects with rounded edges, such as a bowling ball, a paint can, a motorcycle helmet or the like (not shown) to the mounting surface 22 because the net member 12 secures the object to the mounting surface 22 on multiple sides of the object.

Figure 6:
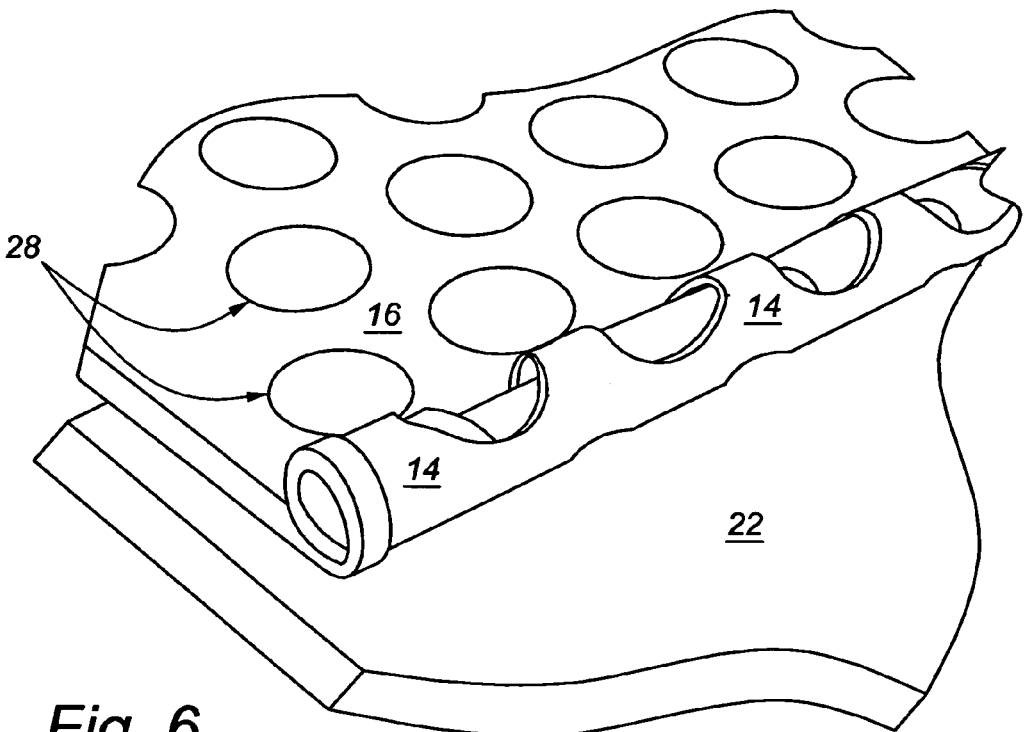
FIG. 6 is a fragmentary perspective view of the apparatus of FIG. 1 with the net member shown in a partially rolled-up position.

Because of the flexible and/or elastic base material 13 of the net member 12 may be advantageously rolled upon itself for easier removal or storage, best seen in FIG. 6, when one does not desire to leave the net member 12 in its stowed position. When the net member 12 is rolled upon itself, the hook members 18 of the first side 14 of net member 12 interact with the loop members 20 on the second side 16 of the net member, providing a strong, yet easily releasable connection.

Because of the robust connections formed between the hook members 18 and the loop members 24, the mounting surface 22 may be any of a horizontal mounting surface, a vertical mounting surface, or a mounting surface between the horizontal and the vertical.

Alternatively, the hook members 18 and the loop members 20 and 24, rather than being formed from conventional hook and loop materials, are selected from 'smart' materials, such as a shape memory alloy or the like, which release on demand without requiring the net member 12 to be manually removed or peeled from the mounting surface 22. Such materials are shown in U.S. Pat. No. 6,766,566, incorporated in its entirety herein by reference. The shape memory alloy hook members 18 are typically small diameter wires formed of a metallic material, such as a nickel titanium alloy, that undergoes a thermoelastic martensitic phase transformation (alternately contract or relax) when a thermal activation signal is applied thereto, such as from an activation device (as described in the U.S. Pat. No. 6,766,566) or the like. When formed of a shape memory alloy, the net member 12 is attached to the mounting surface 22 with the hook members 18 attached to the loop members 20 or 24. A thermal activation signal is applied to the hook members 18 for a predetermined period of time, which forces the hook members 18 to uncurl, releasing the loop members 20 or 24 from the hook members 18. After the net member 12 is released and the object 30 is attached or removed, the thermal activation signal is stopped and the material of the hook members 18 returns to the natural curled or hooked state after another predetermined period of time, ready for their next use.

Figure 7:
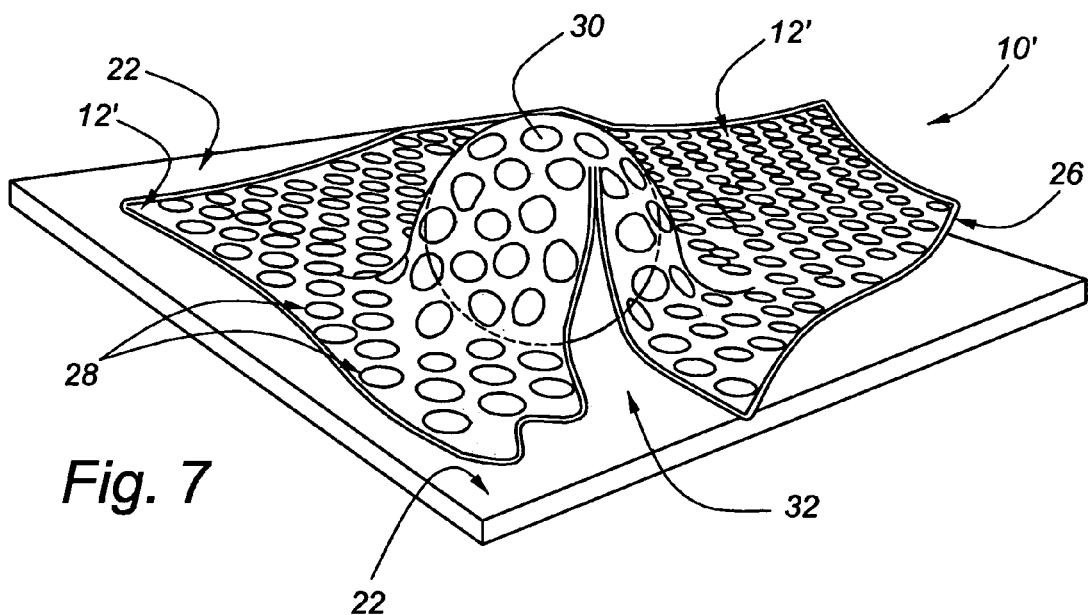
FIG. 7 is a perspective view of an alternative embodiment of an apparatus in accordance with the present invention shown with an object secured to the mounting surface.

Referring now to FIG. 7, an alternative embodiment of an apparatus in accordance with the present invention is indicated generally at 10'. The apparatus 10' includes a net member 12' having at least one and preferably a plurality of elongated perforations 32 extending therethrough. The perforations 32, in conjunction with the apertures 28, allow the net member 12' to flex and bend more easily when storing the object 30 on the mounting surface 22, providing greater flexibility and increasing options for attaching objects, such as the object 30 to the surface 22. The perforations 32 allow for objects, such as the object 30, defining an area larger than the area of the net member 12' to be secured to the mounting surface 22, as the net member 12' will stretch to envelope the object 30.

Figure 8:
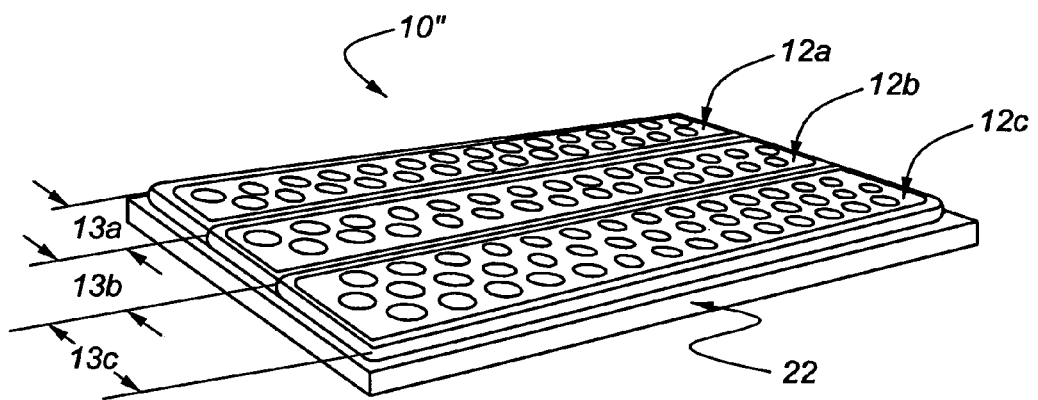
FIG. 8 is a perspective view of another alternative embodiment of an apparatus of in accordance with the present invention shown secured to the mounting surface.
Figure 9:
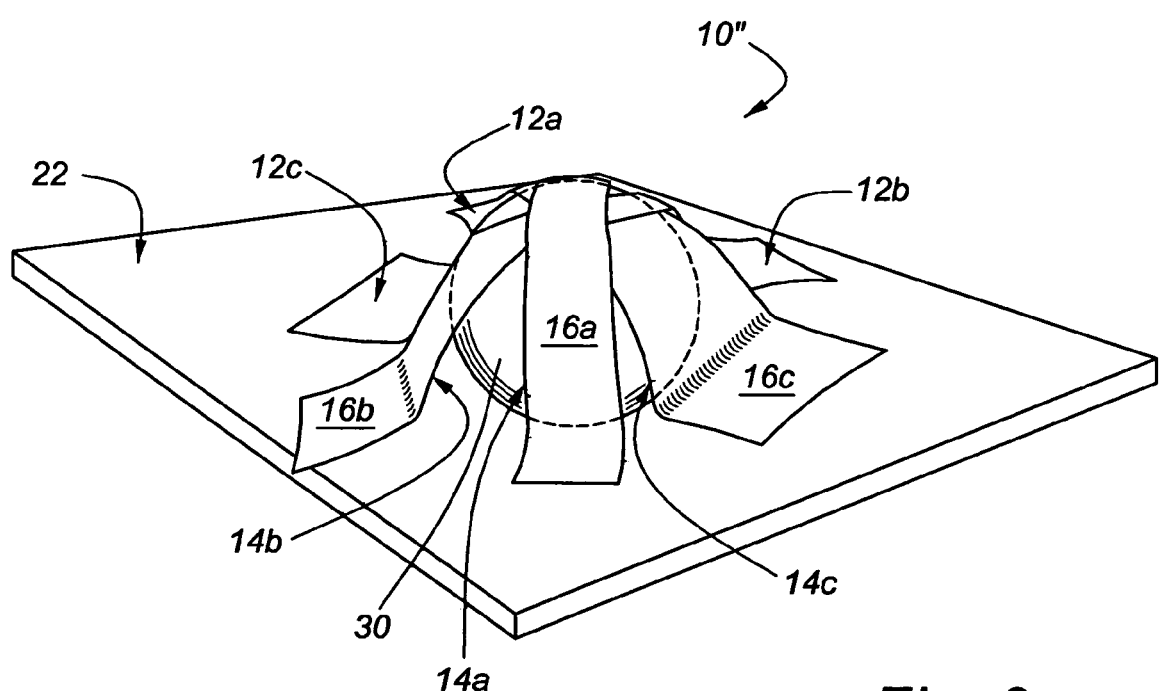
FIG. 9. is a perspective view of the apparatus of FIG. 8 shown with an object secured to the mounting surface.

Referring now to FIGS. 8–9, an alternative embodiment of an apparatus in accordance with the present invention is indicated generally at 10". The apparatus 10" includes a plurality of net members 12a, 12b, and 12c, best seen in FIG. 8. Each of the net members 12a, 12b, and 12c includes the hook members 18 on respective sides 14a, 14b, and 14c and loop members 24 on respective sides 16a, 16b, and 16c. Each of the net members 12a, 12b, and 12c has a width indicated by a respective arrow 13a, 13b, and 13c. The widths 13a, 13b, and 13c may be varied depending on the design of the apparatus 10". When attached to the mounting surface 22, the net members 12a, 12b, and 12c extend to cover substantially all of the mounting surface 22. Each of the net members 12a, 12b, and 12c may be separately and alternately attached to and removed from the mounting surface 22 to attach objects, such as the object 30, of varying size to the mounting surface 22. The net members 12a, 12b, and 12c, as shown in FIG. 9, may function similar to a "bungee" cord, wherein each net member 12a, 12b, and 12c is strapped across the object 30 and fastened to the mounting surface 22 on an opposite side thereof. Additionally, the net members 12a, 12b, and 12c may advantageously attach to one another as well as to the mounting surface 22, which may tend to increase the overall holding strength of the net member 12. The net members 12, 12a, 12b, and 12c are resistant to tangling even if formed as a plurality of members and are aesthetically pleasing when placed in the stowed position.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for retaining objects on a mounting surface having a plurality of loop members extending therefrom, the apparatus comprising:

a net member having a base material with a first surface and an opposed second surface, said first surface having a plurality of hook members extending therefrom adapted to be selectively operatively engageable with the plurality of loop members extending from the mounting surface, said net member operable to be alternately removed from and attached to said mounting surface and retain the objects to said mounting surface, said net member operable to be mounted to said mounting surface in a stowed position to provide a smooth appearance on said mounting surface when not retaining one of the objects, and said second surface having a plurality of loop members extending therefrom.

2. The apparatus according to claim 1 wherein said first and second surfaces of said net member are substantially planar surfaces and said mounting surface is a substantially planar surface.

3. The apparatus according to claim 2 wherein said stowed position is a coplanar stowed position and said net member is mounted to said mounting surface in said coplanar stowed position.

4. The apparatus according to claim 1 wherein the base material of said net member is formed from a flexible material.

5. The apparatus according to claim 1 wherein the base material of said net member is formed from an elastic material.

6. The apparatus according to claim 1 wherein said net member includes a plurality of apertures extending through said base material of said net member.

7. The apparatus according to claim 1 including a hem formed on a circumferential edge of said net member.

8. The apparatus according to claim 1 wherein the plurality of loop members on the mounting surface cover substantially all of the mounting surface.

9. The apparatus according to claim 1 wherein said hook members are formed from a shape memory alloy.

10. The apparatus according to claim 1 wherein the plurality of hook members cover substantially all of the first surface.

11. An apparatus for retaining objects on a substantially planar vehicle mounting surface, the mounting surface having a plurality of loop members disposed thereon, comprising:

a net member having a flexible base material with a first surface and a second surface, said net member including a plurality of hook members extending from said first surface and a plurality of loop members extending from said second surface, said plurality of hook members operable to engage with the plurality of loop members formed on the mounting surface and said plurality of loop members extending from said second surface, said net member operable to be at least partially removed from said mounting surface and be re-engaged with said mounting surface to conform partially to a shape of and retain one of the objects to the mounting surface.

12. The apparatus according to claim 11 wherein said net member includes a plurality of fasteners formed on said second surface.

13. The apparatus according to claim 11 wherein said net member includes a plurality of apertures extending through said base material of said net member.

14. The apparatus according to claim 11 wherein at least a portion of an edge of said net member is rigidly attached to said mounting surface.

15. The apparatus according to claim 11 wherein said plurality of hook members cover substantially all of the first surface.

16. The apparatus according to claim 11 wherein said net member is formed from an elastic material.

17. The apparatus according to claim 11 wherein said net member is mounted to said mounting surface in a coplanar stowed position.

18. An assembly for retaining objects in a vehicle interior, comprising:
   a planar mounting surface having a plurality of loop members disposed thereon; and
   a net member having a first planar surface and a second planar surface and a plurality of apertures extending therethrough, said first planar surface including a plurality of hook members disposed thereon, said second planar surface including a plurality of loop members disposed thereon, said net member including a hem formed on a circumferential edge thereof, at least a portion of said edge of said net member being rigidly attached to said mounting surface, said hook members being formed from a shape memory alloy and operable to releasably engage with said loop members disposed on said mounting surface and retain one of the objects thereto, said net member adapted to be mounted to said mounting surface in a coplanar stowed position to provide a smooth appearance on said mounting surface when not retaining one of the objects.

19. An apparatus for retaining objects on a mounting surface having a plurality of loop members extending therefrom, the apparatus comprising:
   a net member having a base material with a first surface and an opposed second surface, said first surface having a plurality of hook members extending therefrom adapted to be selectively operatively engageable with the plurality of loop members, said net member operable to be alternately removed from and attached to said mounting surface and retain the objects to said mounting surface, said net member operable to be mounted to said mounting surface in a stowed position to provide a smooth appearance on said mounting surface when not retaining one of the objects, and said net member including a hem formed on a circumferential edge thereof.

* * * * *